US009422402B2

(12) United States Patent
Suzuki et al.

(10) Patent No.: US 9,422,402 B2

(45) Date of Patent: Aug. 23, 2016

(54) METHOD OF PRODUCING POLYARYLENE SULFIDE AND POLYARYLENE SULFIDE

(71) Applicant: Kureha Corporation, Tokyo (JP)

(72) Inventors: Kenji Suzuki, Tokyo (JP); Yoshikatsu Satake, Tokyo (JP); Yasuhiro Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/845,420

(22) Filed: Sep. 4, 2015

(65) Prior Publication Data

US 2016/0068636 A1 Mar. 10, 2016

(30) Foreign Application Priority Data

Sep. 5, 2014 (JP) ................................ 2014-181358

(51) Int. Cl.
*C08G 75/16* (2006.01)

(52) U.S. Cl.
CPC .................................... *C08G 75/16* (2013.01)

(58) Field of Classification Search
CPC ...................................................... C08G 75/16
USPC ......................................................... 524/726
See application file for complete search history.

(56) References Cited

U.S. PATENT DOCUMENTS

| | | | | |
|---|---|---|---|---|
| 3,322,834 | A | 5/1967 | Hill et al. | |
| 3,354,129 | A | 11/1967 | Edmonds et al. | |
| 3,524,835 | A | 8/1970 | Edmonds et al. | |
| 4,645,826 | A | 2/1987 | Iizuka et al. | |
| 4,767,841 | A | 8/1988 | Goetz et al. | |
| 4,812,539 | A | 3/1989 | Iizuka et al. | |
| 4,931,516 | A | 6/1990 | Iizuka et al. | |
| 8,680,230 | B2 * | 3/2014 | Konno | C08G 75/0231 525/537 |
| 2005/0228095 | A1 * | 10/2005 | Onishi | C08K 3/0008 524/425 |

FOREIGN PATENT DOCUMENTS

| | | | |
|---|---|---|---|
| JP | S45003368 | B | 2/1970 |
| JP | S46027255 | B | 8/1971 |
| JP | S617332 | A | 1/1986 |
| JP | S6339926 | A | 2/1988 |
| JP | S64-033138 | A | 2/1989 |
| JP | H0651793 | B2 | 7/1994 |
| JP | 2005232247 | A * | 9/2005 |

OTHER PUBLICATIONS

Fahey, D., Hensley, H., Ash, C., and Senn, D., "Poly(p-phenylene sulfide_Syntheses: A Step-Growth Polymerization with Unequal Step Reactivity", Macromolecules 1997, 30, 387-393.

* cited by examiner

*Primary Examiner* — Kelechi Egwim
(74) *Attorney, Agent, or Firm* — Birch, Stewart, Kolasch & Birch, LLP

(57) ABSTRACT

PROBLEM: To provide a method of producing a polyarylene sulfide (PAS) such as polyphenylene sulfide (PPS) in which a dihalo aromatic compound and a sulfur source containing an alkali metal are polymerized in an organic amide solvent, whereby a PAS is produced at higher yield and the amount of NaCl produced as a by-product is reduced to not greater than half that of conventional methods, and, due to a dehydration step being omissible, PAS with excellent practical utility is produced with high productivity in a short time.

SOLUTION: A method of producing a PAS in which a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent; and a PAS of which an average particle size is from 10 to 5000 μm, a melt viscosity measured at a temperature of 310° C. and a shear rate of 1216 sec$^{-1}$ is from 0.1 to 3000 Pa·s, and a nitrogen content is not greater than 500 ppm.

17 Claims, No Drawings

METHOD OF PRODUCING POLYARYLENE SULFIDE AND POLYARYLENE SULFIDE

CROSS-REFERENCE TO RELATED APPLICATIONS

This application claims the benefit of Japanese patent application no. 2014-181358 filed Sep. 5, 2014, the disclosure of which is herein incorporated by reference in its entirety.

TECHNICAL FIELD

The present invention relates to a method of producing a polyarylene sulfide characterized in that a dihalo aromatic sulfide compound and a sulfur source containing an alkali metal are polymerized in an organic amide solvent.

BACKGROUND ART

A polyarylene sulfide (also referred to as "PAS" hereinafter), typified by polyphenylene sulfide (also referred to as "PPS" hereinafter), is an engineering plastic having excellent heat resistance, chemical resistance, flame retardancy, mechanical strength, electrical characteristics, dimensional stability, and the like. Polyarylene sulfides are frequently used in a wide range of fields such as electrical/electronic equipment and automobile equipment due to their moldability into various molded products, films, sheets, fibers, and the like by general melt processing methods such as extrusion molding, injection molding, and compression molding.

A known typical method of producing a PAS is to polymerize a dihalo aromatic compound such as p-dichlorobenzene (also referred to as "PDCB" hereinafter) and a sulfur source containing an alkali metal, as an aqueous mixture containing a polar organic solvent such as N-methyl-2-pyrrolidone (also referred to as "NMP" hereinafter) while heating (for example, under temperature conditions around 175 to 350° C.) (Patent Documents 1 and 2), thereby obtaining a PAS such as PPS. Another known method to produce a high-molecular-weight PAS is a two-stage polymerization method whereby polymerization is performed while varying the polymerization temperature and the water content present in the polymerization reaction system (Patent Documents 3 and 4).

According to the PAS production method in which a dihalo aromatic compound and a sulfur source containing an alkali metal are polymerized as an aqueous mixture containing a polar organic solvent while heating, a PAS is produced via the reaction below. Specifically, when PDCB (denoted as "Cl-ϕ-Cl") is used as the dihalo aromatic compound, sodium sulfide ($Na_2S$) is used as the sulfur source containing an alkali metal, and NMP is used as the polar organic solvent, PPS $\{—(-\phi\text{-S}—)_n—\}$ is produced according to the following Formula 1:

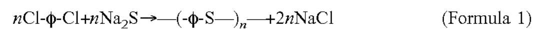

$$n\text{Cl-}\phi\text{-Cl} + n\text{Na}_2\text{S} \rightarrow —(-\phi\text{-S}—)_n— + 2n\text{NaCl} \quad \text{(Formula 1)}$$

and at the same time, a large amount of NaCl, namely 2n times the molar quantity of the obtained PPS, is produced as a by-product. For this reason, it is difficult to increase the production quantity per polymerizer (polymerization vessel). Furthermore, since the by-product NaCl does not dissolve in NMP, it is present as a solid in an ordinary polymerization reaction system, and therefore it attaches to and contaminates the walls of the polymerizer (e.g., polymerization vessel) and causes abrasion of those walls. Since NaCl must be removed by washing, the burden of post-treatment is also large.

Other known typical methods for producing a PAS include a method in which PPS (a polythioether) is obtained by condensing diphenylsulfide and sulfur chloride in the presence of at least one substance selected from the group consisting of iron, aluminum, aluminum amalgam, Lewis acids, and protonic acids (Patent Document 5); a method of producing PPS in which 4,4'-dimercapto diphenylsulfide and 4,4'-dihalo diphenylsulfide are polymerized in a solvent while being held at a temperature of 200 to 400° C. in the presence of an alkali carbonate or an alkali bicarbonate (Patent Document 6); and a method in which a thiophenol and a halogenated aromatic compound are polymerized. However, the sulfur sources differ in these PAS production methods, and the polymerization reactions proceed via completely different reaction mechanisms than the reaction mechanism described above.

In the PAS production method wherein a dihalo aromatic compound and a sulfur source containing an alkali metal are polymerized as an aqueous mixture containing a polar organic solvent while heating, the polymerization temperature must be raised as high as possible in order to increase the polymerization rate, but conditions must be strictly selected because it will be accompanied by polymerization reactions in the polar organic solvent occurring at higher temperatures. For example, the proportions of dihalo aromatic compound, sulfur source containing alkali metal, and polar organic solvent are optimized, and the like. When the polymerization temperature is increased, various side reactions may readily occur. For example, the side reaction product produced when the polar organic solvent NMP is ring-opened and the open-ring NMP reacts with the dihalo aromatic compound PDCB (chlorophenyl methyl aminobutyric acid (also referred to as "CPMABA" hereinafter)) bonds with the molecular terminals of the PAS to inhibit the polymerization reaction, and there is the risk that a high-molecular-weight PAS can no longer be obtained or that yield will decrease due to consumption of the dihalo aromatic compound (PDCB) which is a PAS starting material.

The polymerization reaction between the dihalo aromatic compound and the sulfur source containing an alkali metal is affected by the water content present in the polymerization reaction system. In particular, when the polymerization reaction is performed at high temperature in order to obtain a high reaction rate, abnormal reactions such as a decomposition reaction or the like may readily occur if a large amount of water and a sulfur source containing an alkali metal are present in the polymerization reaction system. Therefore, a dehydration step is often required prior to the step of preparing (also referred to as the "charging step" hereinafter) the mixture (also referred to as the "charged mixture" hereinafter) of dihalo aromatic compound, sulfur source containing an alkali metal, polar organic solvent, and water to be submitted to the polymerization reaction. In the dehydration step, unnecessary water is expelled to outside the system under normal pressure while the sulfur source containing an alkali metal and the polar organic solvent are heated to a temperature of, for example, approximately 150 to 210° C. Because sulfur sources containing an alkali metal, e.g., sodium sulfide ($Na_2S$), often contain water of crystallization, it is normally necessary to reduce the water of crystallization. In many cases, the required dehydration step is performed using the apparatus that performs the polymerization reaction, and there are also cases where it constitutes from 20 to 50% of the polymerization time. Thus, this is one of the problems to be solved to increase PAS productivity.

Since PASs such as PPS, which are engineering plastics having excellent heat resistance, chemical resistance, flame retardancy, mechanical strength, electrical characteristics, dimensional stability, and the like, have come to be used in a wide range of fields, a more efficient method of producing PASs has come to be demanded. Specifically, in a method of producing a PAS in which a dihalo aromatic compound and a sulfur source containing an alkali metal are polymerized in an organic amide solvent which is a polar organic solvent, a method of producing a PAS whereby production of reaction by-products such as CPMABA is suppressed and PAS with excellent practical utility is produced at a higher yield, a polymerization method whereby the amount of NaCl produced as a by-product of PAS production is reduced, and a method whereby, due to a dehydration step being omissible, PAS with excellent practical utility is produced with high productivity in a short time, are also demanded.

CITATION LIST

Patent Literature

Patent Document 1: Japanese Examined Patent Application Publication No. S45-3368

Patent Document 2: Japanese Examined Patent Application Publication No. H6-51793

Patent Document 3: Japanese Unexamined Patent Application Publication No. S61-7332A Patent Document 4: Japanese Unexamined Patent Application Publication No. S63-39926A Patent Document 5: Japanese Examined Patent Application Publication No. S46-27255

Patent Document 6: Japanese Unexamined Patent Application Publication No. S64-33138A

SUMMARY OF INVENTION

Technical Problem

An object of the present invention is to provide a method of producing a polyarylene sulfide (PAS) such as PPS in which a dihalo aromatic compound and a sulfur source containing an alkali metal are polymerized in an organic amide solvent, whereby a PAS is produced at higher yield and the amount of NaCl produced as a by-product is reduced, and, due to a dehydration step being omissible, PAS with excellent practical utility is produced with high productivity in a short time.

Solution to Problem

As a result of diligent research to achieve the above object, the present inventors discovered that the problems can be solved by polymerizing a certain dihalo aromatic sulfide compound and a sulfur source containing an alkali metal in an organic amide solvent, and thereby achieved the present invention.

That is, a first aspect of the present invention provides (1) a method of producing a polyarylene sulfide in which a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent.

Furthermore, as specific modes, the first aspect of the present invention also provides the methods of producing a PAS of items (2) to (16) below.

(2) The method of producing a PAS according to (1) above, wherein, in the formula, Ar is a phenylene group and X is chlorine.

(3) The method of producing a PAS according to (1) or (2) above, wherein, in the formula, n is from 1 to 5.

(4) The method of producing a PAS according to any one of (1) to (3) above, wherein the sulfur source containing an alkali metal contains one or both of an alkali metal sulfide and an alkali metal hydrosulfide.

(5) The method of producing a PAS according to any one of (1) to (4) above, comprising the following step 1:

Step 1: a charging step of preparing a charged mixture containing an organic amide solvent, a dihalo aromatic sulfide compound, a sulfur source containing an alkali metal, and water.

(6) The method of producing a PAS according to (5) above, further comprising the following steps 2 and 3:

Step 2: a pre-stage polymerization step of initiating a polymerization reaction while heating the charged mixture and producing a prepolymer having a dihalo aromatic sulfide compound conversion ratio of not less than 30%;

Step 3: a post-stage polymerization step of heating and continuing a polymerization reaction in a state in which water is present in an amount of 3.5 to 20 moles per 1 kg of organic amide solvent.

(7) The method of producing a PAS according to (5) or (6) above, wherein, in the charging step, a charged mixture containing from 0.9 to 1.5 moles of dihalo aromatic sulfide compound per 1 mole of sulfur source containing an alkali metal is prepared.

(8) The method of producing a PAS according to any one of (5) to (7) above, wherein, in the charging step, a charged mixture containing from 0.1 to 7 moles of water per 1 kg of organic amide solvent is prepared.

(9) The method of producing a PAS according to any one of (5) to (8) above, wherein, in the charging step, a charged mixture containing from 0.75 to 1.2 moles of alkali metal hydroxide per 1 mole of sulfur source containing an alkali metal is prepared.

(10) The method of producing a PAS according to any one of (6) to (9) above, wherein, in the pre-stage polymerization step, a charged mixture prepared in the charging step is polymerized while heating at a temperature of 150 to 270° C.

(11) The method of producing a PAS according to any one of (6) to (10) above, wherein, in the pre-stage polymerization step, a prepolymer having a dihalo aromatic sulfide compound conversion ratio of 50 to 100% is produced.

(12) The method of producing a PAS according to any one of (6) to (11) above, wherein, in the post-stage polymerization step, a polymerization reaction is continued while heating at a temperature of 245 to 290° C.

(13) The method of producing a PAS according to any one of (1) to (12) above, wherein the method is performed in the presence of a phase separation agent.

(14) The method of producing a PAS according to (13) above, wherein the phase separation agent is at least one selected from the group consisting of organic carboxylic acid metal salts, organic sulfonic acid metal salts, alkali metal halides, alkali earth metal halides, alkali earth metal salts of aromatic carboxylic acids, phosphoric acid alkali metal salts, alcohols, paraffin-based hydrocarbons, and water.

(15) The method of producing a PAS according to any one of (6) to (14) above, wherein, in the post-stage polymerization step, a polymerization reaction is continued in a state in which the reaction system has been phase-separated into a polymer dense phase and a polymer dilute phase.

(16) The method of producing a PAS according to any one of (5) to (15) above, wherein a dehydration step is provided before the charging step, the dehydration step comprising heating a mixture containing an organic amide solvent and a sulfur source containing an alkali metal, and discharging at least some of a distillate containing water from inside the system containing the mixture to outside the system.

Furthermore, another aspect of the present invention provides the PAS of (17) below.

(17) A PAS, of which an average particle size is from 10 to 5000 μm, a melt viscosity measured at a temperature of 310° C. and a shear rate of 1216 $sec^{-1}$ is from 0.1 to 3000 Pa·s, and a nitrogen content is not greater than 500 ppm, and which is obtained by a method of producing a PAS in which a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent.

Advantageous Effects of Invention

According to the first aspect of the present invention, because it is a method of producing a PAS in which a dihalo aromatic sulfide compound represented by the formula: X—(—Ar—S—)$_n$—Ar—X (in the formula, Ar represents an optionally substituted aromatic group, X represents a halogen atom, and n is from 1 to 10), and a sulfur source containing an alkali metal are polymerized in an organic amide solvent, it demonstrates the effect of providing a method of producing a PAS such as PPS in which a dihalo aromatic compound and a sulfur source containing an alkali metal are polymerized in an organic amide solvent, whereby a PAS is produced at higher yield and the amount of NaCl produced as a by-product is reduced to not greater than half that of conventional methods, and, due to a dehydration step being omissible, PAS with excellent practical utility is produced with high productivity in a short time.

Furthermore, another aspect of the present invention demonstrates the effect of providing a PAS having few impurities and high quality with excellent ease of handling, of which the average particle size is from 10 to 5000 μm, the melt viscosity measured at a temperature of 310° C. and a shear rate of 1216 $sec^{-1}$ is from 0.1 to 3000 Pa·s, and the nitrogen content is not greater than 500 ppm, and which is obtained by a method of producing a PAS in which a dihalo aromatic sulfide compound represented by the formula:

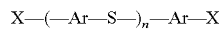

(in the formula, Ar represents an optionally substituted aromatic group, X represents a halogen atom, and n is from 1 to 10)

and a sulfur source containing an alkali metal are polymerized in an organic amide solvent.

DESCRIPTION OF EMBODIMENTS

I. Method of Producing Polyarylene Sulfide

The method of producing a PAS of the present invention is characterized in that a dihalo aromatic sulfide compound represented by the formula:

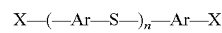

(in the formula, Ar represents an optionally substituted aromatic group, X represents a halogen atom, and n is from 1 to 10)

and a sulfur source containing an alkali metal are polymerized in an organic amide solvent.

1. Dihalo Aromatic Sulfide Compound:

As the dihalo aromatic compound, the method of producing a PAS of the present invention uses a dihalo aromatic sulfide compound represented by the formula:

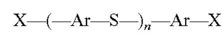

(in the formula, Ar represents an optionally substituted aromatic group, X represents a halogen atom, and n is from 1 to 10).

Aromatic Group

In the dihalo aromatic sulfide compound represented by the above formula used in the present invention, examples of the aromatic group of Ar (i.e., the optionally substituted aromatic group) include a phenylene group, a biphenylene group, a naphthalene group, and the like, but a phenylene group is preferred. A plurality of Ar groups may be the same or different. Examples of substituents in Ar include alkyl groups such as a methyl group and an ethyl group; alkoxy groups such as a methoxy group and an ethoxy group; and functional groups such as a carboxyl group, a hydroxyl group, a nitro group, an amino group, and a sulfonate group. The aromatic group may contain one or a plurality of substituents, and if there are a plurality of substituents, the bond positions of the substituents are not particularly limited. Needless to say, Ar (i.e., the optionally substituted aromatic group) may be an aromatic group not having any substituents.

Bonding of Ar and S

In the dihalo aromatic sulfide compound represented by the above formula, the position of the S atom bond to the Ar (i.e., the optionally substituted aromatic group) in —Ar—S— is not particularly limited, but from the perspective of reactivity, and the like, it preferably results in a p-position relationship.

Number of n

In the dihalo aromatic sulfide compound represented by the above formula, n is from 1 to 10. When n is less than 1, it contains substantially no dihalo aromatic sulfide compound for producing a PAS, and as a result, it is not possible to produce a PAS at a higher yield and the amount of NaCl produced as a by-product is not reduced to not greater than half that of conventional methods, and PAS with excellent practical utility is not produced with high productivity in a short time due to a dehydration step being omissible. When n is greater than 10, preparation and handling of the dihalo aromatic sulfide compound are industrially and/or commercially difficult. In the dihalo aromatic sulfide compound represented by the above formula, n is preferably from 1 to 5, more preferably 1 or 2, and even more preferably 1 from the perspectives described above. Accordingly, a particularly preferred dihalo aromatic sulfide compound is a dihalo sulfide compound represented by X—Ar—S—Ar—X (the two Ar groups may be the same or different).

—Ar—S—

As described above, in the dihalo aromatic sulfide compound represented by the above formula, a plurality of Ar groups may be the same or different, but additionally, if n is 2 or greater, the plurality of —Ar—S— moieties may be the same or different. Specifically, as the dihalo aromatic sulfide compounds used in the present invention, dihalo aromatic sulfide compounds having the same aromatic group, substituent, and S atom bond position may be used, or —Ar—S— moieties having a different structure in the aromatic group, substituent, or S atom bond position may also be combined.

Halogen Atom (X), and Bonding of Ar and X

In the dihalo aromatic sulfide compound used in the present invention, a halogen atom indicates an element selected from fluorine, chlorine, bromine, and iodine, among which chlorine is preferred from the perspectives of reactivity, ease of handling, and the like. The two halogen atoms contained in one dihalo aromatic sulfide compound may be the same or different, and furthermore, each of the two halogen atoms contained in two or more dihalo aromatic sulfide compounds may be the same or different. It is preferred that all halogen atoms are chlorine (Cl) from the perspectives of reactivity and ease of handling, but they are not limited thereto. The positions of the two halogen atom (X) bonds to Ar (i.e., the optionally substituted aromatic group) are not particularly limited, but from the perspective of reactivity, they preferably result in a p-position relationship relative to the S atom to which Ar is bonded, and more preferably, they result in both of the two halogen atoms (X) being in a p-position relationship relative to the S atom to which Ar is bonded.

Specific Examples of Dihalo Aromatic Sulfide Compound

From the above descriptions, examples of the dihalo aromatic sulfide compound used in the present invention include bis(4-halophenyl)sulfides, bis(4'-halo-[1,1'-biphenyl]-4-yl)sulfides, and bis(6-halonaphthalen-2-yl)sulfides, in which n is 1, and compounds in which all or some of these aromatic groups contain a substituent. Further examples include 1,4-bis((4-halophenyl)thio)benzenes, 4,4'-bis((4'-halo-[1,1'-biphenyl]-4-yl)thio)-1,1'-biphenyls, and 2,6-bis((6-halonaphthalen-2-yl)thio)naphthalenes, in which n is 2, and compounds in which all or some of these aromatic groups contain a substituent. Similarly, examples also include bis(4-((4-halophenyl)thio)phenyl)sulfides, bis(4'-((4'-halo-[1,1'-biphenyl]-4-yl)thio)-[1,1'-bipheyl]-4-yl)sulfides, and bis(6-((6-halonaphthalen-2-yl)thio)naphthalen-2-yl)sulfides, in which n is 3; 1,4-bis((4-((4-halobiphenyl)thio)phenyl)thio)benzenes, 4,4'-bis((4'-((4'-halo-[1,1'-biphenyl]-4-yl)thio)-[1,1'-biphenyl]-4-yl)thio)-1,1'-biphenyls, and 2,6-bis((6-((6-halonaphthalen-2-yl)thio)naphthalen-2-yl)thio)naphthalenes, in which n is 4; bis(4-((4-((4-halophenyl)thio)phenyl)thio)phenyl)sulfides, bis(4'-((4'-((4'-halo-[1,1'-biphenyl]-4-yl)thio)-[1,1'-biphenyl]-4-yl)thio)-[1,1'-biphenyl]-4-yl)sulfides, and bis(6-((6-((6-halonaphthalen-2-yl)thio)naphthalen-2-yl)thio)naphthalen-2-yl)sulfides, in which n is 5; and compounds in which all or some of these aromatic groups contain a substituent. From the perspectives of reactivity and ease of handling, preferred examples are bis(4-halophenyl)sulfides and 1,4-bis((4-halophenyl)thio)benzenes and the like in which n is 1 or 2; more preferred examples are bis(4-chlorophenyl)sulfide and 1,4-bis((4-chlorophenyl)thio)benzene and the like; and a particularly preferred example is bis(4-chlorophenyl)sulfide (also denoted as "4,4'-dichlorodiphenylsulfide"). These dihalo aromatic sulfide compounds may each be used alone or in a combination of two or more types thereof.

Preparation of Dihalo Aromatic Sulfide Compound

The dihalo aromatic sulfide compound used in the present invention can be prepared by reacting a dihalo aromatic compound such as PDCB with sodium hydrosulfide according to the following Formula (2):

$$2Cl\text{-}\phi\text{-}Cl + NaSH \rightarrow Cl\text{-}\phi\text{-}S\text{-}\phi\text{-}Cl + NaCl + HCl, \quad \text{(Formula 2)}$$

but a commercially available dihalo aromatic sulfide compound may also be used.

Use of Other Dihalo Aromatic Compounds and the Like

In the method of producing a PAS of the present invention, it is preferred that only the certain dihalo aromatic sulfide compounds represented by the above formula are used as the dihalo aromatic compound reacted with the sulfur source, but a dihalo aromatic compound other than the above dihalo aromatic sulfide compounds may be used provided that the object of the present invention is not hindered. For example, PDCB or the like may be used in combination in an amount of normally not greater than 10 parts by mass, preferably not greater than 5 parts by mass, and more preferably not greater than 3 parts by mass, relative to 100 parts by mass of the above dihalo aromatic sulfide compound.

2. Sulfur Source Containing an Alkali Metal:

As a sulfur source, the method of producing a PAS of the present invention uses a sulfur source containing an alkali metal. As the sulfur source containing an alkali metal, a sulfur source that contains one or both of an alkali metal sulfide and an alkali metal hydro sulfide may be used.

Examples of alkali metal sulfides include lithium sulfide, sodium sulfide, potassium sulfide, rubidium sulfide, cesium sulfide, mixtures of two or more types thereof, and the like. Of these, sodium sulfide and lithium sulfide are preferable in that they can be procured inexpensively on an industrial scale. These alkali metal sulfides are normally commercially available and used as hydrates. The hydrates are preferably 1 to 9 hydrates, examples of which include sodium sulfide 9·hydrate ($Na_2S.9H_2O$), sodium sulfide 5·hydrate ($Na_2S.5H_2O$), and the like. The alkali metal sulfide may be used as an aqueous mixture from the viewpoints of ease of handling and prevention of oxidation by air. In this case, it is normally from 15 to 85 mass %, preferably from 25 to 80 mass %, more preferably from 30 to 70 mass %, and particularly preferably from 40 to 60 mass % of alkali metal sulfide in the aqueous mixture.

Examples of alkali metal hydrosulfides include lithium hydrosulfide, sodium hydrosulfide, potassium hydrosulfide, rubidium hydrosulfide, cesium hydrosulfide, mixtures of two or more types thereof, and the like. Of these, sodium hydrosulfide and lithium hydrosulfide are preferable in that they can be procured inexpensively on an industrial scale. The alkali metal hydrosulfide may be used as an aqueous mixture from the viewpoints of ease of handling and prevention of oxidation by air. In this case, it is normally from 30 to 85 mass %, preferably from 40 to 80 mass %, more preferably from 45 to 75 mass %, and particularly preferably from 50 to 70 mass % of alkali metal sulfide in the aqueous mixture.

The alkali metal sulfide may be prepared in situ in an organic amide solvent from hydrogen sulfide or an alkali metal hydrosulfide and an alkali metal hydroxide. The alkali metal sulfide may contain a small amount of an alkali metal hydrosulfide. The alkali metal hydrosulfide may contain a small amount of an alkali metal sulfide. In these cases, the total molar quantity of the sulfur source containing an alkali metal made of alkali metal sulfides and alkali metal hydrosulfides serves as the sulfur source submitted to the polymerization reaction in the polymerization step after a dehydration step provided as necessary (i.e., the "charged sulfur source"). When an alkali metal sulfide and an alkali metal hydrosulfide are used as a mixture, naturally the mixture of the two components serves as the charged sulfur source.

When the sulfur source contains an alkali metal hydrosulfide, an alkali metal hydroxide is used in combination. Examples of alkali metal hydroxides include lithium hydroxide, sodium hydroxide, potassium hydroxide, rubidium hydroxide, cesium hydroxide, mixtures of two or more types thereof, and the like. Of these, sodium hydroxide and lithium hydroxide are preferable in that they can be procured inexpensively on an industrial scale. The alkali metal hydroxide may be used as an aqueous mixture from the viewpoints of ease of handling and prevention of oxidation by air. In this case, it is normally from 30 to 85 mass %, preferably from 40 to 80 mass %, and more preferably from 45 to 78 mass % of alkali metal sulfide in the aqueous mixture.

3. Molecular Weight Adjusting Agent, Branching/Crosslinking Agent

As desired, a monohalo compound (not necessarily an aromatic compound) may be used in combination to form terminals of a certain structure in the obtained PAS or to adjust the polymerization reaction or molecular weight. In order to introduce a branched or crosslinked structure into the obtained PAS, it is possible to use a combination of a polyhalide compound to which three or more halogen atoms are bonded (not necessarily an aromatic compound), an active hydrogen-containing halogenated aromatic compound, a halogenated aromatic nitro compound, or the like. A preferred example of a polyhalo compound serving as a branching/crosslinking agent is trihalobenzene.

4. Organic Amide Solvent:

In the method of producing a PAS of the present invention, an organic amide solvent that is an aprotic polar organic solvent is used as a solvent for the polymerization reaction. The organic amide solvent is preferably stable with respect to alkalis at high temperatures. Specific examples of organic amide solvents include amide compounds such as N,N-dimethylformamide and N,N-dimethylacetamide; N-alkyl caprolactam compounds such as N-methyl-ϵ-caprolactam; N-alkyl pyrrolidone compounds or N-cycloalkyl pyrrolidone compounds such as N-methyl-2-pyrrolidone (NMP) and N-cyclohexyl-2-pyrrolidone; N,N-dialkyl imidazolidinone compounds such as 1,3-dialkyl-2-imidazolidinone; tetraalkyl urea compounds such as tetramethyl urea; and hexaalkyl phosphoric acid triamide compounds such as hexamethyl phosphoric acid triamide; and the like. These organic amide solvents may each be used alone or in a combination of two or more types thereof.

Of these organic amide solvents, N-alkyl pyrrolidone compounds, N-cycloalkyl pyrrolidone compounds, N-alkyl caprolactam compounds, and N,N-dialkyl imidazolidinone compounds are preferred, N-methyl-2-pyrrolidone (NMP), N-methyl-ϵ-caprolactam, and 1,3-dialkyl-2-imidazolidinone are particularly preferred, and NMP is especially preferred.

5. Polymerization Aid:

In the method of producing a PAS of the present invention, various polymerization aids may be used as necessary to accelerate the polymerization reaction and obtain a PAS with a high degree of polymerization in a shorter time. Specific examples of polymerization aids include water, organic carboxylic acid metal salts, organic sulfonic acid metal salts, alkali metal halides such as lithium halide, alkali earth metal halides, alkali earth metal salts of aromatic carboxylic acids, phosphoric acid alkali metal salts, alcohols, paraffin-based hydrocarbons, and the like, which are generally known as PAS polymerization aids, and mixtures of two or more of these, and the like. An alkali metal carboxylic acid salt is preferred as the organic carboxylic acid metal salt. Examples of the alkali metal carboxylic acid salt include lithium acetate, sodium acetate, potassium acetate, sodium propionate, lithium valerate, lithium benzoate, sodium benzoate, sodium phenylacetate, potassium p-toluate, and mixtures of two or more of these. Sodium acetate is particularly preferred as the alkali metal carboxylic acid salt because it is inexpensive and easy to procure.

The amount of polymerization aid used in the method of producing a PAS of the present invention varies depending on the type of compound, but is normally from 0.01 to 5 moles, preferably from 0.015 to 2 moles, more preferably from 0.02 to 1.8 moles, and particularly preferably from 0.025 to 1.7 moles, relative to 1 mole of charged sulfur source. When the polymerization aid is an organic carboxylic acid metal salt, organic sulfonic acid salt, or alkali metal halide, the upper limit of the used amount thereof is preferably not greater than 0.7 moles, and more preferably not greater than 0.6 moles, relative to 1 mole of charged sulfur source.

6. Phase Separation Agent:

In the method of producing a PAS of the present invention, various phase separation agents may be used to accelerate the polymerization reaction and obtain a PAS with a high degree of polymerization in a shorter time or to cause phase separation and obtain a granular PAS. A phase separation agent is a compound having an action of dissolving in an organic amide solvent so as to reduce the solubility of the PAS in the organic amide solvent by itself or in the presence of a small amount of water. The phase separation agent itself is a compound that is not a solvent of the PAS.

A compound that is publicly known to function as a phase separation agent may be used as the phase separation agent. Phase separation agents also include compounds used as the above polymerization aid, but here, a phase separation agent means a compound used in a mass ratio by which it can function as a phase separation agent in the step of performing a polymerization reaction in the phase-separated state (i.e., phase-separated polymerization step), or in a mass ratio sufficient to cause phase separation in its presence after polymerization is complete. Preferred specific examples of the phase separation agent are at least one compound selected from the group consisting of organic carboxylic acid metal salts, organic sulfonic acid metal salts, alkali metal halides such as lithium halide, alkali earth metal halides, alkali earth metal salts of aromatic carboxylic acids, phosphoric acid alkali metal salts, alcohols, paraffin-based hydrocarbons, and water. Preferred examples of the organic carboxylic acid metal salt include alkali metal carboxylic acid salts such as lithium acetate, sodium acetate, potassium acetate, sodium propionate, lithium valerate, lithium benzoate, sodium benzoate, sodium phenylacetate, potassium p-toluate, and the like. These phase separation agents may each be used alone or in a combination of two or more types thereof. Among these phase separation agents, water or combinations of water and an organic carboxylic acid metal salt such as an alkali metal carboxylic acid salt are particularly preferred because they are inexpensive in cost and post-treatment is simple.

Even when water is used as the phase separation agent, a phase separation agent other than water may be used in combination as a polymerization aid from the perspective of performing efficient phase-separated polymerization. If water and another phase separation agent are used in combination in the phase-separated polymerization step, the total amount thereof must be an amount that can induce phase separation. It does not matter if at least some of the phase separation agent is present from when the polymerization reaction components are charged, but it is preferred that the phase separation agent is added during the polymerization reaction or that it is prepared in an amount sufficient to form phase separation after the polymerization reaction.

When the method of producing a PAS of the present invention is performed in the presence of a phase separation agent, the used amount of the phase separation agent differs depending on the type of phase separation agent, but is normally from 0.01 to 30 moles, preferably from 0.015 to 20 moles, more preferably from 0.02 to 15 moles, and particularly preferably from 0.15 to 12 moles, relative to 1 kg of organic amide solvent.

II. Polyarylene Sulfide Production Step

The method of producing a PAS of the present invention is characterized in that a PAS in which a dihalo aromatic sulfide compound represented by the formula:

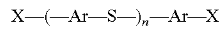

(in the formula, Ar represents an optionally substituted aromatic group, X represents a halogen atom, and n is from 1 to 10)

and a sulfur source containing an alkali metal are polymerized in an organic amide solvent. That is, a polymerization step of polymerizing the above dihalo aromatic sulfide compound and a sulfur source containing an alkali metal in an organic amide solvent is mandatory in the present invention.

According to the method of producing a PAS of the present invention, the polymerization reaction that produces the PAS proceeds as follows. Specifically, when bis(4-chlorophenyl)sulfide in which Ar is a phenylene group, X is chlorine (bonded at p-position relative to S), and n is 1 (as described previously, this is also denoted as "4,4'-dichlorodiphenylsulfide"; it may also be referred to as "DCDPS" and may be denoted as "Cl-ϕ-S-ϕ-Cl" hereinafter) is used as the dihalo aromatic sulfide compound, sodium sulfide ($Na_2S$) is used as the sulfur source containing an alkali metal, and NMP is used as the organic amide solvent, PPS [—(-ϕ-S—)$_n$—] is produced according to the following Formula (3):

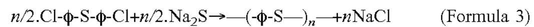

and NaCl is produced as a by-product in a quantity n times the molar quantity of the obtained PPS. The amount of the by-product NaCl is reduced to half, since NaCl is produced as a by-product in a quantity 2n times the molar quantity of the obtained PPS when PDCB is used as the dihalo aromatic compound as described above. Therefore, the method of producing a PAS of the present invention makes it possible to increase the produced amount of PAS per polymerization vessel.

The polymerization method itself in the method of producing a PAS of the present invention may be any polymerization method provided that the present invention is preserved. In general, polymerization methods that produce granular PAS can be broadly classified as (i) methods in which the polymerization step includes a phase-separated polymerization step, and gradual cooling is performed after phase-separated polymerization, (ii) methods in which, after the polymerization reaction, a phase separation agent is added and gradual cooling is performed, (iii) methods using a polymerization aid such as lithium chloride, and (iv) methods in which cooling of the reaction vessel gas phase portion is cooled.

Among these, when a granular PAS is produced by a polymerization method that includes a step of a polymerization reaction performed in the presence of a phase separation agent while controlling the polymerization conditions in a phase-separated state in which the produced polymer dense phase and produced polymer dilute phase are mixed in the polymerization reaction system, sieving efficiency in the separation step can be increased and yield and productivity improved because a granular PAS with a high degree of polymerization is obtained. Therefore, it has served as a polymerization method that is beneficial in increasing the yield of a granular PAS with a high degree of polymerization. The polymerization step in this case will be described in detail below.

1. Charging Step

The polymerization step included in the method of producing a PAS may be carried out via the following charging step. The charging step (step 1) is a step of preparing a charged mixture containing an organic amide solvent, the dihalo aromatic sulfide compound described above, a sulfur source containing an alkali metal, and water. In this step, an alkali metal hydroxide is further added as necessary to the components of the above mixture, and a mixture of these prescribed components (i.e., a charged mixture) is prepared.

The used amount of the above dihalo aromatic sulfide compound (used proportion in the charged mixture) is normally from 0.9 to 1.5 moles, preferably from 0.92 to 1.1 moles, and more preferably from 0.95 to 1.05 moles, relative to 1 mole of the sulfur source containing an alkali metal (also referred to as "charged molar ratio" hereinafter). If the charged molar ratio of the above dihalo aromatic sulfide compound relative to the sulfur source containing an alkali metal is too high, it becomes difficult to produce a PAS of high molecular weight. On the other hand, if the charged molar ratio of the above dihalo aromatic sulfide compound relative to the sulfur source containing an alkali metal is too low, a decomposition reaction readily occurs, which makes it difficult to carry out a stable polymerization reaction.

In the charging step, if an alkali metal hydroxide is added, it is preferable to prepare a charged mixture containing from 0.75 to 1.2 moles, and more preferably from 0.8 to 1.1 moles, of alkali metal hydroxide per mole of sulfur source containing an alkali metal. Also, in the charging step, it is preferable to prepare a charged mixture containing from 0.1 to 7 moles of water, and more preferably from 0.2 to 5 moles of water, per 1 kg of organic amide solvent.

Additionally, in the charging step, the amount of organic amide solvent is normally from 0.1 to 10 kg, preferably from 0.15 to 2 kg, and more preferably from 0.2 to 1 kg, per 1 mole of sulfur source containing an alkali metal.

2. Polymerization Step

In the method of producing a PAS of the present invention, a polymerization step is performed following the charging step (step 1). The polymerization step may be performed in one stage but is preferably performed in a two-stage process including a pre-stage polymerization step and a post-stage polymerization step. Specifically, it preferably comprises a pre-stage polymerization step (step 2), in which the charged mixture is heated to a temperature of preferably 150 to 270° C., more preferably from 180 to 265° C., and the polymerization reaction is initiated, and a prepolymer having a dihalo aromatic sulfide compound conversion ratio of not less than 30%, preferably from 50 to 100%, and more preferably from 80 to 100%, is produced; and a post-stage polymerization step (step 3), in which the prepolymer is heated to a temperature of 245 to 290° C., more preferably from 255 to 285° C., and the polymerization reaction is continued in a state in which from 3.5 to 20 moles of water is present per 1 kg of organic amide solvent. The reaction time in the polymerization step is generally from 10 minutes to 20 hours, and preferably from 30 minutes to 10 hours.

The method of producing a PAS of the present invention can produce a PAS of high molecular weight in a shorter time than conventional methods because the polymerization reaction of the above dihalo aromatic sulfide compound represented by the formula:

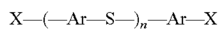

$$X—(—Ar—S—)_n—Ar—X$$

(in the formula, Ar represents an optionally substituted aromatic group, X represents a halogen atom, and n is from 1 to 10)

and a sulfur source containing an alkali metal proceeds rapidly due to the fact that the above dihalo aromatic sulfide compound and the sulfur source containing an alkali metal are polymerized in an organic amide solvent. Additionally, it greatly suppresses the problems of the conventional methods of producing a PAS, namely that the organic amide solvent NMP is ring-opened and the open-ring NMP reacts with the dihalo aromatic compound, resulting in the dihalo aromatic compound which is a starting material being consumed by a side reaction, and that the polymerization reaction is inhibited due to the open-ring NMP and side reaction products reacting with the molecular terminals of the PAS. Therefore, consumption of the PAS starting material dihalo aromatic sulfide compound in side reactions and a decrease in yield due to hindering of the polymerization reaction are markedly suppressed compared to conventional methods.

The method of producing a PAS of the present invention is preferably performed in the presence of a phase separation agent, and in particular, the polymerization step may also include a polymerization step of polymerizing the above dihalo aromatic sulfide compound and sulfur source containing an alkali metal in an organic amide solvent in a state phase-separated into a produced polymer dense phase and a produced polymer dilute phase in the polymerization reaction system in the presence of a phase separation agent. As the phase separation agent, water or a compound known to function as a phase separation agent as described above or the like is preferably used.

Furthermore, in the polymerization step, it is preferred that the above dihalo aromatic sulfide compound and sulfur source containing an alkali metal are polymerized in an organic amide solvent at a temperature of 170 to 270° C., and at the point when the conversion ratio of the above dihalo aromatic sulfide compound reaches not less than 30%, a phase separation agent is added into the polymerization reaction mixture to allow a phase separation agent to be present in the polymerization reaction system, and then, the polymerization reaction mixture is heated, and at a temperature of 245 to 290° C., the polymerization reaction is continued in a state phase-separated into a produced polymer dense phase and a produced polymer dilute phase in the polymerization reaction system in the presence of the phase separation agent.

Additionally, in the polymerization step, it is preferred that the polymerization reaction is performed by at least a two-stage polymerization process, including a pre-stage polymerization step, in which the above dihalo aromatic sulfide compound and sulfur source containing an alkali metal are polymerized in an organic amide solvent, and a polymer in which the conversion ratio of the above dihalo aromatic sulfide compound is not less than 30%, preferably from 50 to 100%, and more preferably from 80 to 100%, is produced; and a post-stage polymerization step, in which the polymerization reaction is continued in a state phase-separated into a produced polymer dense phase and a produced polymer dilute phase in the polymerization reaction system in the presence of a phase separation agent.

Specifically, in the polymerization step, it is more preferred that the polymerization reaction is performed by at least a two-stage polymerization process, including a pre-stage polymerization step, in which the above dihalo aromatic sulfide compound and sulfur source containing an alkali metal are polymerized in an organic amide solvent in a state in which water is present in the amount of 0.1 to 7 moles per 1 kg of organic amide solvent at a temperature of 150 to 270° C., and a polymer in which the conversion ratio of the above dihalo aromatic sulfide compound is from 80 to 100% is produced; and a post-stage polymerization step, in which the polymerization reaction is continued in a state phase-separated into a produced polymer dense phase and a produced polymer dilute phase in the polymerization reaction system, by heating to a temperature of 245 to 290° C. and adjusting the water content inside the polymerization reaction system so as to result in water being present in an amount of 3.5 to 20 moles per 1 kg of organic amide solvent.

The above conversion ratio of the dihalo aromatic sulfide compound is a value calculated by the following formulas. When the above dihalo aromatic sulfide compound is added in excess of the sulfur source by molar ratio, the conversion ratio is calculated using the following formula:

Conversion ratio=[(charged amount of the above dihalo aromatic sulfide compound(moles)−remaining amount of the above dihalo aromatic sulfide compound(moles))/(charged amount of the above dihalo aromatic sulfide compound (moles)−excess amount of the above dihalo aromatic sulfide compound(moles))]×100

In other cases, the conversion ratio is calculated using the following formula:

Conversion ratio=[(charged amount of the above dihalo aromatic sulfide compound(moles)−remaining amount of the above dihalo aromatic sulfide compound(moles))/(charged amount of the above dihalo aromatic sulfide compound (moles)]×100

The amount of coexisting water in the reaction system in the pre-stage polymerization step, as described previously, is from 0.1 to 7 moles, preferably from 0.2 to 5 moles, and more preferably from 1 to 4.5 moles, per 1 kg of organic amide solvent. This often corresponds to a range of normally from 0.01 to 5.5 moles, preferably from 0.05 to 5 moles, and more preferably from 0.1 to 4.5 moles, per 1 mole of sulfur source containing an alkali metal (charged sulfur source).

In the pre-stage polymerization step, it is desirable to produce a polymer (also referred to as "prepolymer" hereinafter) of which the melt viscosity measured at a temperature of 310° C. and a shear rate of 1216 $sec^{-1}$ is normally from 0.1 to 30 Pa·s.

The post-stage polymerization step is not simply a step of classifying and granulating the polymer (prepolymer) produced in the pre-stage polymerization step, but is for inducing an increase in the degree of polymerization of that polymer.

In the post-stage polymerization step, water is particularly preferred as the phase separation agent, and it is preferred that the amount of water in the polymerization reaction system is adjusted by adding water as a phase separation agent so as to result in a state in which water is present in an amount of 3.5 to 20 moles, preferably from 4.1 to 15 moles, and more preferably from 4.2 to 10 moles, per 1 kg of organic amide solvent. In the post-stage polymerization step, if the coexisting water content in the polymerization reaction system is not greater than 3.5 moles or is greater than 20 moles per 1 kg of organic amide solvent, the degree of polymerization of the produced PAS may decrease. In particular, when post-stage polymerization is performed when the coexisting water content is from 4.3 to 9 moles, it is preferred because a PAS with a high degree of polymerization is readily obtained.

In a more preferred production method, water and a phase separation agent other than water may be used in combination as the phase separation agent in order to carry out polymerization with a small amount of phase separation agent. In this mode, it is preferred that the amount of water in the polymerization reaction system is adjusted to from 0.1 to 20 moles, preferably from 0.2 to 10 moles, more preferably from 0.3 to 8 moles, and particularly preferably from 0.5 to 5 moles, per 1 kg of organic amide solvent, and that the phase separation agent other than water is present in the range of 0.01 to 1 mole per 1 kg of organic amide solvent. Another phase separation agent that is particularly preferred for combined use with water is an organic carboxylic acid metal salt, especially an alkali metal carboxylic acid salt, and in this case, water is used in an amount of 0.1 to 15 moles, preferably from 0.5 to 10 moles, and particularly preferably from 0.8 to 8 moles, per 1 kg of organic amide solvent, and the alkali metal carboxylic acid salt is used in an amount of 0.001 to 0.7 moles, preferably from 0.02 to 0.6 moles, and particularly preferably from 0.05 to 0.5 moles.

The polymerization temperature of the post-stage polymerization step is in the range of 245 to 290° C. If the polymerization temperature is less than 245° C., it is difficult to obtain a PAS with a high degree of polymerization, and if it is greater than 290° C., there is risk of the PAS and the organic amide solvent decomposing. In particular, a temperature range of 250 to 270° C. is preferred because a PAS with a high degree of polymerization is readily obtained.

3. Optional Dehydration Step as Desired

In the method of producing a PAS of the present invention, the polymerization reaction between the above dihalo aromatic sulfide compound and the sulfur source containing an alkali metal proceeds at a high rate without performing a conventional dehydration step to expel unnecessary water to outside the system, under normal pressure while heating a sulfur source containing an alkali metal and a polar organic solvent to a temperature of, for example, around 150 to 210° C. prior to the charging step. Therefore, the dehydration step is not a mandatory step in the method of producing a PAS of the present invention. As a result, in the method of producing a PAS, great savings on equipment and energy is anticipated because the time that was spent on the dehydration process can be reduced.

However, a dehydration step can be provided prior to the charging step as desired with the objective of reducing moisture, comprising water of crystallization (hydrate water) or water medium contained in the sulfur source containing an alkali metal, such as sodium sulfide ($Na_2S$) or the like, and water produced as a by-product, to within the desired range.

If a dehydration step is provided, it is preferably carried out by a method in which a mixture containing an organic amide solvent and sulfur source containing an alkali metal are heated and reacted in an inert gas atmosphere, and at least some of the distillate containing water is discharged from inside the system containing the mixture to outside the system by distillation. In the dehydration step, dehydration is performed until the coexisting water content in the polymerization reaction system reaches normally from 0.1 to 7 moles, preferably from 0.2 to 5 moles, and more preferably from 1 to 4.5 moles, relative to 1 kg of organic amide solvent. If a dehydration step is provided, the sulfur source before the polymerization step that comes after the dehydration step is called a "charged sulfur source." If the water content becomes too low due to the dehydration step, water may be added before the polymerization step to adjust it to the desired water content.

4. Post-Treatment Steps (Separation Step, Washing Step, Recovery Step, and the Like)

In the production method of the present invention, post-treatment steps after the polymerization reaction may be performed by customary methods. For example, after the polymerization reaction is completed, a separation step, in which the produced slurry containing the PAS is diluted with water or the like as desired while in the high-temperature state or after cooling, and then the PAS is filtered out by sieving or the like; a washing step, in which the separated PAS is repeatedly washed with hot water or an organic solvent such as the same organic amide solvent as the polymerization solvent, a ketone (for example, acetone), or an alcohol (for example, methanol), and then filtered; and a recovery step, in which PAS is recovered by drying, may be performed. The produced PAS can also be treated with an acid or a salt such as ammonium chloride.

Because it can produce a granular polymer, the method of producing a PAS of the present invention is preferred because a granular polymer can be easily separated from by-products, oligomers, and the like by separating it from the reaction solution by sieving using a screen. Furthermore, according to the method of producing a PAS of the present invention, the load required to wash and remove NaCl produced as a by-product by the polymerization reaction from the granular polymer or discharged liquid is greatly reduced.

III. Polyarylene Sulfide

According to the method of producing a PAS of the present invention, the generation of by-products is suppressed, and a high-quality PAS with few impurities can be obtained. That is, according to the present invention, it is possible to obtain a PAS of which the average particle size is from 10 to 5000 μm, the melt viscosity measured at a temperature of 310° C. and a shear rate of 1216 $sec^{-1}$ is from 0.1 to 3000 Pa·s, and the nitrogen content is not greater than 500 ppm, and which is obtained by a method of producing a PAS in which a dihalo aromatic sulfide compound represented by the formula:

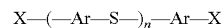

$$X—(—Ar—S—)_n—Ar—X$$

(in the formula, Ar represents an optionally substituted aromatic group, X represents a halogen atom, and n is from 1 to 10)

and a sulfur source containing an alkali metal are polymerized in an organic amide solvent.

A PAS having excellent ease of handling can be obtained at a high yield because the PAS of the present invention has an average particle size of normally from 10 to 5000 μm, preferably from 30 to 4000 μm, and more preferably from 50 to 3000 μm, and has a melt viscosity measured at a temperature of 310° C. and a shear rate of 1216 $sec^{-1}$ of normally from 0.1 to 3000 Pa·s, preferably from 0.5 to 2000 Pa·s, more preferably from 1 to 1000 Pa·s, and even more preferably from 5 to 500 Pa·s. Note that the melt viscosity of the PAS can be measured under prescribed temperature and shear rate conditions using a capillograph using approximately 20 g of dry polymer.

Furthermore, the PAS of the present invention is a high-quality PAS with few impurities, and the nitrogen content in the PAS polymer is not greater than 500 ppm. The nitrogen content in the PAS polymer can be measured by weighing out approximately 1 mg of polymer sample and performing elemental analysis using a nitrogen-sulfur microanalyzer. The nitrogen content in the PAS polymer is more preferably not greater than 450 ppm, and even more preferably not greater than 400 ppm. The lower limit of the nitrogen content in the PAS polymer is, of course, 0 ppm, but in many cases, around 10 ppm may be considered the lower limit. According to the method of producing a PAS of the present invention, a high-quality PAS with few impurities can be obtained at a high yield greater than 90 mass %. The PAS yield is the yield of polymer obtained by calculating the proportion of PAS polymer mass actually recovered relative to a standard value, the standard value being the mass (stoichiometric quantity) of the polymer assuming that all of the effective sulfur source present in the reaction vessel after the dehydration step has been converted to PAS polymer. According to the method of producing a PAS of the present invention, the PAS yield can be considered to be not less than 91 mass %, and further, not less than 92 mass %. The upper limit of PAS yield is, of course, 100 mass %, but it is normally around 99.5 mass %.

The PAS obtained by the method of producing a PAS of the present invention, either without modification or after oxidative crosslinking, can be molded into various injection molded products or extrusion molded products such as sheets, films, fibers, or pipes, alone or by adding various inorganic fillers, fibrous fillers, and various synthetic resins as desired. The PAS obtained by the production method of the present invention has good color tone. Furthermore, compounds of the PAS obtained by the production method of the present invention generates few volatile components and is advantageous in fields such as electronic devices in which suppression of volatile components is expected. PPS is particularly preferred as the PAS used in these applications.

EXAMPLES

The present invention will be more specifically described hereinafter with reference to working examples and comparative examples. However, the present invention is not limited to these examples. The measurement methods for the various characteristics or physical properties are as follows.

(1) Polymer Yield

The yield of the PAS polymer (also referred to simply as "polymer" hereinafter) was taken to be the yield (units: mass %) of the polymer obtained by calculating the proportion of polymer mass actually recovered relative to a standard value, the standard value being the mass (stoichiometric quantity) of the polymer assuming that all of the sulfur source supplied in the charging step (in the case where a dehydration step is provided according to desire, the sulfur source present in the reaction vessel after the dehydration step) was converted to polymer.

(2) Melt Viscosity

Melt viscosity was measured using a Capillograph 1C manufactured by Toyo Seiki Co., Ltd. using approximately 20 g of dry polymer. At this time, the capillary was a flat die measuring 1 mm ϕ×10 mm L, and the set temperature was 310° C. The polymer sample was introduced into the apparatus, and after the sample was held for 5 minutes, the melt viscosity at a shear rate of 1216 $sec^{-1}$ was measured (units: Pa·s).

(3) Amount of Sulfur Source

For the sodium sulfide ($Na_2S$) and sodium hydrosulfide (NaSH) in the sulfur source aqueous solution, the total mass of the sulfur component was determined by iodimetry, and the mass of NaSH was determined by neutralization titration. The remainder after subtracting the mass of NaSH from the total mass of the sulfur component was taken to be the mass of $Na_2S$.

(4) Nitrogen Content

The nitrogen content in the polymer was determined by weighing out approximately 1 mg of polymer sample and performing elemental analysis (units: ppm) using a nitrogen-sulfur micro analyzer (model Antek 7000 manufactured by ASTECH corporation).

Working Example 1

In a reaction vessel, 131 g (0.51 moles) of commercially available DCDPS, 45.9 g (0.51 moles) of sodium hydrosulfide of concentration 62.2 mass %, 28.9 g (0.53 moles) of sodium hydroxide of concentration 73.3 mass %, and 508 g of NMP were added (the quantity of water present at this time was 4 moles relative to 1 kg of NMP), and this was reacted at a temperature of 180° C. for 2 hours while stirring with a stirrer attached to the reaction vessel, and after that, when the temperature was raised to 230° C. for 60 minutes, a prepolymer with a DCDPS conversion ratio of 99% was produced (pre-stage polymerization step). Then, 27.5 g of water was injected, the temperature was raised to 265° C. and the mixture was reacted for 2.5 hours (post-stage polymerization step), and PAS was produced. At this time, the amount of produced sodium chloride was 59.5 g.

After the reaction was complete, the reaction mixture was cooled to near room temperature, and the reaction solution was passed through a 100 mesh screen and granular PAS was sieved out. The separated PAS polymer was washed with acetone twice and rinsed with water three times, and then it was washed with acetic acid of concentration 3.0 mass % once and rinsed with water four times, and washed PAS was obtained. This washed polymer was dried at a temperature of 105° C. for 13 hours, and granular PAS was obtained. The percent yield of the obtained PAS granular polymer was 91.3%, and the yield in grams was 100.4 g. The average particle size was 1474 μm, the melt viscosity was 150 Pa·s, and the nitrogen content was 137 ppm.

Comparative Example 1

A PAS was produced in the same manner as Working Example 1 (here the produced sodium chloride was 117.9 g) except that i) 149.9 g (1.02 moles) of commercially available PDCB was used instead of commercially available DCDPS, and 91.8 g (1.01 moles) of sodium hydrosulfide of concentration 62.2 mass % and 57.8 g (1.06 moles) of sodium hydroxide of concentration 73.3 mass % were added; ii) as a dehydration step, it was heated to a temperature of 140 to 195° C. for approximately 2 hours under atmospheric pressure (the quantity of water present at this time was 4 moles relative to 1 kg of NMP); iii) in the pre-stage polymerization step, the mixture was heated at 220° C. for 1 hour and then the temperature was raised from 220° C. to 230° C. for 0.5 hr, and the mixture was reacted at 230° C. for 1.5 hours, and a prepolymer with a PDCB conversion ratio of 90% was produced; and (iv) in the post-stage polymerization step, the mixture was reacted at a temperature of 265° C. for 3 hours. Then, granular PAS was sieved out, washed, and rinsed with water. The percent yield of the obtained PAS granular polymer was 89%, and the yield in grams was 97.0 g. The average particle size was 1299 μm, the melt viscosity was 140 Pa·s, and the nitrogen content was 658 ppm.

From Working Example 1 and Comparative Example 1 it was understood that according to the method of producing a PAS of the present invention, characterized in that a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent, the above dihalo aromatic sulfide compound and sulfur source containing an alkali metal react at a high reaction rate, and since no reaction product (CPMABA) is produced by a reaction of open-ring NMP and the dihalo aromatic compound (PDCB), which was a problem of conventional methods, high-purity PAS is obtained at a high yield. Furthermore, since the amount of NaCl produced together with the PAS is reduced to half, an increase in the produced amount of PAS is anticipated and the load of post-treatment steps including desalination is reduced, and improved production efficiency is expected.

INDUSTRIAL APPLICABILITY

Industrial applicability of the present invention is high because, due to the invention being a method of producing a PAS characterized in that a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent, a PAS is produced at higher yield and the amount of NaCl produced as a by-product is reduced to not greater than half that of conventional methods, and, due to a dehydration step being omissible, PAS with excellent practical utility is produced with high productivity in a short time, in a method of producing a PAS in which a dihalo aromatic compound and a sulfur source containing an alkali metal are polymerized in an organic amide solvent.

Furthermore, industrial applicability of the present invention is high because it can provide a high-quality PAS with few impurities and excellent ease of handling due to it being a PAS of which the average particle size is from 10 to 5000 μm, the melt viscosity measured at a temperature of 310° C. and a shear rate of 1216 sec$^{-1}$ is from 0.1 to 3000 Pa·s, and the nitrogen content is not greater than 500 ppm, and which is obtained by a method of producing a PAS characterized in that a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent.

The invention claimed is:

1. A method of producing a polyarylene sulfide in which a dihalo aromatic sulfide compound represented by the formula: X—(—Ar—S—)$_n$—Ar—X (in the formula, Ar represents an optionally substituted aromatic group, X represents a halogen atom, and n is from 1 to 10)

and a sulfur source containing an alkali metal are polymerized in an organic amide solvent.

2. The method of producing a polyarylene sulfide according to claim 1, wherein, in the formula, Ar is a phenylene group and X is chlorine.

3. The method of producing a polyarylene sulfide according to claim 1, wherein, in the formula, n is from 1 to 5.

4. The method of producing a polyarylene sulfide according to claim 1, wherein the sulfur source containing an alkali metal contains one or both of an alkali metal sulfide and an alkali metal hydrosulfide.

5. The method of producing a polyarylene sulfide according to claim 1, comprising the following step 1:

Step 1: a charging step of preparing a charged mixture containing an organic amide solvent, a dihalo aromatic sulfide compound, a sulfur source containing an alkali metal, and water.

6. The method of producing a polyarylene sulfide according to claim 5, further comprising the following steps 2 and 3:

Step 2: a pre-stage polymerization step of initiating a polymerization reaction while heating the charged mixture and producing a prepolymer having a dihalo aromatic sulfide compound conversion ratio of not less than 30%;

Step 3: a post-stage polymerization step of heating and continuing a polymerization reaction in a state in which water is present in an amount of 3.5 to 20 moles per 1 kg of organic amide solvent.

7. The method of producing a polyarylene sulfide according to claim 5, wherein, in the charging step, a charged mixture containing from 0.9 to 1.5 moles of dihalo aromatic sulfide compound per 1 mole of sulfur source containing an alkali metal is prepared.

8. The method of producing a polyarylene sulfide according to claim 5, wherein, in the charging step, a charged mixture containing from 0.1 to 7 moles of water per 1 kg of organic amide solvent is prepared.

9. The method of producing a polyarylene sulfide according to claim 5, wherein, in the charging step, a charged mixture containing from 0.75 to 1.2 moles of alkali metal hydroxide per 1 mole of sulfur source containing an alkali metal is prepared.

10. The method of producing a polyarylene sulfide according to claim 6, wherein, in the pre-stage polymerization step, a charged mixture prepared in the charging step is polymerized while heating at a temperature of 150 to 270° C.

11. The method of producing a polyarylene sulfide according to claim 6, wherein, in the pre-stage polymerization step, a prepolymer having a dihalo aromatic sulfide compound conversion ratio of 50 to 100% is produced.

12. The method of producing a polyarylene sulfide according to claim 6, wherein, in the post-stage polymerization step, a polymerization reaction is continued while heating at a temperature of 245 to 290° C.

13. The method of producing a polyarylene sulfide according to claim 1, performed in the presence of a phase separation agent.

14. The method of producing a polyarylene sulfide according to claim 13, wherein the phase separation agent is at least one selected from the group consisting of organic carboxylic acid metal salts, organic sulfonic acid metal salts, alkali metal halides, alkali earth metal halides, alkali earth metal salts of aromatic carboxylic acids, phosphoric acid alkali metal salts, alcohols, paraffin-based hydrocarbons, and water.

15. The method of producing a polyarylene sulfide according to claim 6, wherein, in the post-stage polymerization step, a polymerization reaction is continued in a state in which the reaction system has been phase-separated into a polymer dense phase and a polymer dilute phase.

16. The method of producing a polyarylene sulfide according to claim 5, wherein a dehydration step is provided before the charging step, the dehydration step comprising heating a mixture containing an organic amide solvent and a sulfur source containing an alkali metal, and discharging at least some of a distillate containing water from inside the system containing the mixture to outside the system.

17. A polyarylene sulfide, of which an average particle size is from 10 to 5000 μm, a melt viscosity measured at a temperature of 310° C. and a shear rate of 1216 $sec^{-1}$ is from 0.1 to 3000 Pa·s, and a nitrogen content is not greater than 500 ppm, and which is obtained by a method of producing a polyarylene sulfide in which a dihalo aromatic sulfide compound represented by the formula: $X—(—Ar—S—)_n—Ar—X$ (in the formula, Ar represents an optionally substituted aromatic group, X represents a halogen atom, and n is from 1 to 10)

and a sulfur source containing an alkali metal are polymerized in an organic amide solvent.

* * * * *